United States Patent
Sanders et al.

(10) Patent No.: US 7,522,284 B2
(45) Date of Patent: Apr. 21, 2009

(54) OPTICAL RESONATOR GYRO AND METHOD FOR REDUCING RESONANCE ASYMMETRY ERRORS

(75) Inventors: Glen A. Sanders, Scottsdale, AZ (US); Lee K. Strandjord, Tonka Bay, MN (US); Tiequn Qiu, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 434 days.

(21) Appl. No.: 11/540,771

(22) Filed: Sep. 29, 2006

(65) Prior Publication Data

US 2008/0079947 A1 Apr. 3, 2008

(51) Int. Cl.
    *G01C 19/72* (2006.01)
(52) U.S. Cl. ..................................... 356/461
(58) Field of Classification Search ............... 356/459, 356/461, 470
    See application file for complete search history.

(56) References Cited

U.S. PATENT DOCUMENTS

| | | | | |
|---|---|---|---|---|
| 4,135,822 | A * | 1/1979 | Ezekiel | 356/461 |
| 4,274,742 | A * | 6/1981 | Lustig | 356/470 |
| 4,396,290 | A * | 8/1983 | Morris | 356/461 |
| 4,825,261 | A * | 4/1989 | Schroeder | 356/461 |
| 4,842,409 | A * | 6/1989 | Arditty et al. | 356/460 |
| 5,137,356 | A * | 8/1992 | Malvern | 356/461 |
| 6,539,155 | B1 | 3/2003 | Broeng et al. | |
| 2004/0263856 | A1 | 12/2004 | Willig et al. | |

FOREIGN PATENT DOCUMENTS

EP    0 240 949 A2    10/1987
EP    1 391 693 A1    2/2004

OTHER PUBLICATIONS

PCT International Search Report PCT/US2006/002839, Jun. 6, 2006.
Carroll, R. et al., "The Passive Resonator Fiber Optic Gyro and Comparison to the Interferometer Fiber Gyro," SPIE Milestones Ser. 1989, vol. MS 8, pp. 486-494.
Sanders, G.A. et al., Optical Gyro with Free Space Resonator and Method for Sensing Inertial Rotation Rate, Nov. 17, 2005, 19 pages, U.S. Appl. No. 11/282,229, USA.
Sanders, G.A., et al., System and Method for Stabilizing Light Sources In Resonator Gyro, Dec. 9, 2005, 37 pages, U.S. Appl. No. 11/298,439, USA.
Sanders, G.A. et al., Hollow Core Fiber Optical Gyro, Jan. 6, 2006, 17 pages, U.S. Appl. No. 11/342,158, USA.

* cited by examiner

*Primary Examiner*—Tarifur R Chowdhury
*Assistant Examiner*—Jonathon D Cook
(74) *Attorney, Agent, or Firm*—Black Lowe & Graham PLLC

(57) ABSTRACT

Methods and apparatus are provided for attenuating rotation rate errors in a resonator gyro. The gyro includes a ring resonator having a hollow core optical fiber coil and optical elements that are selected and/or oriented to reduce stray light that may be present in input light beams introduced to the ring resonator. The resonator has a predetermined mode. One of the optical elements partially transmits a portion of the input light beam to a first end of the fiber coil while partially transmitting a portion of the input light beam to a filter. Light having the predetermined mode is accepted into the first end of the fiber coil, and the filter accepts light of the input light beam having a corresponding mode. Transmission components of the circulating light beams indicates resonance peaks of the counter-propagating directions of the ring resonator.

20 Claims, 3 Drawing Sheets

OPTICAL RESONATOR GYRO AND METHOD FOR REDUCING RESONANCE ASYMMETRY ERRORS

FIELD OF THE INVENTION

The present invention generally relates to gyro systems, and more particularly relates to rotational sensors for use in navigation systems and attitude control.

BACKGROUND OF THE INVENTION

Gyros have been used to measure rotation rates or changes in angular velocity about an axis of rotation. A basic conventional fiber optic gyro (FOG) includes a light source, a beam generating device, and a coil of optical fiber coupled to the beam generating device that encircles an area. The beam generating device transmits light beams into the coil that propagate in a clockwise (CW) direction and a counter-clockwise (CCW) direction along the core of the optical fiber. Many FOGs utilize glass-based optical fibers that conduct light along a solid glass core of the fiber. The two counter-propagating (e.g., CW and CCW) beams experience different pathlengths while propagating around a rotating closed optical path, and the difference in the two pathlengths is proportional to the rotational rate.

In a resonator fiber optic gyro (RFOG), the counter-propagating light beams are desirably monochromatic (e.g., in a single frequency) and circulate through multiple turns of the fiber optic coil and for multiple passes through the coil using a device that redirects light, that has passed through the coil, back into the coil again (i.e., circulates the light), such as a fiber coupler. The beam generating device modulates and/or shifts the frequencies of each of the counter-propagating light beams so that the resonance frequencies of the resonant coil may be observed. The resonance frequencies for each of the CW and CCW paths through the coil are based on a constructive interference condition such that all light-waves, having traversed the coil a different number of times, interfere constructively at any point in the coil. As a result of this constructive interference, an optical wave having a wavelength $\lambda$ is referred to as "on resonance" when the round trip resonator optical pathlength is equal to an integral number of wavelengths. A rotation of the coil produces a different optical pathlength for clockwise and counterclockwise propagation, thus producing a shift between the respective resonance frequencies of the resonator, and the frequency difference, such as may be measured by tuning the difference in the CW beam and CCW beam frequencies to match the resonance frequency shift of the closed optical path due to rotation, indicates the rotation rate.

In the RFOG, the glass material of the optical fiber may give rise to effects that shift the resonance frequencies of the CW and CCW paths and thus produce a false indication of rotation or inaccurate measurement of rotation rate. Anomalies, stemming from the glass medium, that decrease the accuracy of the rotational rate measurement may be generated from a non-linear Kerr effect, stimulated Brillouin scattering, polarization errors, and Rayleigh backscatter errors. These error mechanisms are also sensitive to the environment which, for example, gives rise to unwanted temperature sensitivity. A reflective mirror may be used to circulate the counter-propagating light beams in the coil multiple times, but this typically reduces the signal-to-noise ratio from losses generated at the transition from the mirror to the coil.

The non-linear Kerr effect occurs when high monochromatic light power inside the RFOG alters the index of refraction of the glass in the optical fiber. A mismatch of intensities of the CW and CCW beams may induce a bias on the observed frequency shifts on the order of several degrees/hour, for example. Stimulated Brillouin scattering (SBS) occurs when high intensity light associated with a high finesse in the fiber resonator causes lasing or stimulated emission in the glass fiber, and this generally promotes large instabilities in the measurement of the resonance frequencies. Polarization-induced errors may result from fiber couplers that incidentally couple light into a second polarization mode, either from one optical fiber to an adjacent optical fiber or within the same fiber. The second polarization mode may resonate producing an asymmetry in the resonance lineshape of the polarization mode used to measure a rotation. Even though the frequency of the second polarization mode is the same for the CW and CCW beams, the amplitude may be different, thus causing different observations, beyond those affected by rotation, of the resonance frequencies of the CW and CCW beams. Polarization-induced errors may severely limit the accuracy of the RFOG because determination of the resonance centers for each of the resonance frequencies of the CW and CCW beams directly affects the rotational rate measurement. Rayleigh backscatter errors may be a source of drift rate in a resonator gyro. Backscattered light from the glass within the fiber or from imperfections with the fiber can interfere with the circulating light beams and cause significant drift rate errors.

The RFOG may encounter additional anomalies that decrease the accuracy of the rotational rate measurement. In a reflecting mode, the ring resonator reflects a portion of light having a state matched with a pre-determined state of the resonator. The portion of light in this desired state, that is the reflected portion, grows as its frequency is detuned from the resonance frequency of the resonator. At resonance, the reflected portion is minimized, thus the resonance frequencies for each of the CW and CCW paths through the fiber optic coil are detected by monitoring the light that does not enter the resonator. The resonance is thus observed as a "resonance dip" because less light is observed when the resonator is near resonance than when the resonator is not near resonance. As previously mentioned, successive recirculation of each of the counter-propagating light beams produces constructive interference at the resonance frequencies, and the center of a resonance dip in the resonance lineshape indicates a resonance frequency. It is desirable to have a definitive symmetrical resonance dip to more accurately indicate the resonance frequency. To this end, the resonator may be designed to circulate light in a pre-determined state (e.g., TEM00-S representing a state of the light having a lowest order spatial mode and a vertical polarization in a free space resonator).

In particular, the total light wave in the matched state (e.g., a mode-matched reflected wave) that is reflected from the resonator comprises two electric field waves, one that is immediately reflected from the mirror or coupler at the entrance to the resonator (e.g., a mode-matched zero-pass wave) and one that is derived from light that has circulated within the resonator (e.g., a mode-matched circulated wave). The mode-matched circulated includes light that has traveled in the resonator coil and has been transmitted back out of the resonator entrance (e.g., via a fiber coupler or mirror). The mode-matched circulated wave amplitude is typically a fraction of the light wave amplitude that circulates within the coil. This fraction is determined by the transmission coefficient of the coupler or mirror. The net result is that the electric field of the total light wave in the matched state is a superposition of the mode-matched zero-pass wave and the mode-matched circulated wave. The intensity of the total mode-matched reflected wave may be determined by the interference between the mode-matched zero-pass wave and the mode-matched circulated wave, which is the subject of detection.

When the frequency of the input wave is substantially detuned from resonance, the mode-matched circulated wave amplitude is substantially zero because the amplitude of the wave from which the mode-matched circulated wave was derived is substantially zero. Thus, the light reflected from the resonator consists of only the mode-matched zero-pass wave, and thus the total mode-matched circulated wave has a maximum intensity. This is true since the mode-matched circulated wave does not interfere destructively with the mode-matched zero-pass wave. Near resonance, the light circulating inside the resonator grows significantly, and thus the light in the mode-matched circulated wave similarly grows significantly and subsequently destructively interferes with the mode-matched zero-pass wave to produce the dip observed in the total mode-matched reflected wave. Further, at the resonance center, the light circulating inside the resonator is at a maximum, and thus the light in the mode-matched circulated wave is at a maximum which produces a maximum destructive interference with the mode-matched zero-pass wave to produce the bottom of the observed dip in the total mode-matched reflected wave. In this ideal case, the resonance dip of the light in the mode-matched state alone is symmetrical. In other words, detuning the input frequency slightly to either side of the dip produces a proportional increase in the intensity of the total mode-matched reflected wave intensity. In practice, a symmetric line-shape is generally required for accurate measurements of the resonance center.

Light energy that is solely in the matched state, or solely in the desired input light component, produces a symmetric resonance dip that is ideal for rotation sensing. However, practical issues may constrain the light energy at the input to the resonator from being substantially in the mode-matched state. For example, some non-resonant, stray, undesired light (e.g., light that is not properly matched in the polarization mode or the spatial mode of the resonator) in the input wave may be present which may be reflected from the resonator and interfere with the light in the total mode-matched reflected state described above. This additional component of light, by interfering with the desired light, may produce an asymmetrical resonance dip, thus producing errors in the detection of the resonance centers. Thus, the symmetry of the resonance dip may be affected by several factors including, but not necessarily limited to, a residual launch light component in the input light beam to the resonator having either 1) an undesired polarization state or 2) light, from the input light beam to the resonator with a spatial distribution that overlaps with higher order spatial modes of the light in the resonator. Both of these typically result from an imperfect input light condition or launch condition at the input to the resonator. Although the residual launch light component may not resonate in the resonator when the desired light component is near resonance, this residual light may adversely affect the observed shape of the resonance dip resulting from the desired light component.

A mode of the resonator refers to a particular electric field transverse electric field distribution and polarization state that reproduces itself at each longitudinal point (e.g., along the axis of propagation) in the resonator after each round-trip through the resonator when at resonance. Because the resonator normally includes both free space optics and a fiber optic waveguide, the modes of the resonator are based on light propagation properties in both media, but the spatial distribution of the resonator mode at points within the fiber is typically a spatial mode of the fiber, or generally, a superposition of modes of the fiber. The preferred case, for the lowest loss and greatest performance, at points along the axis of the fiber, the spatial distribution of the resonator mode is substantially that of the lowest order spatial mode of the fiber (e.g., one that preserves itself while propagating along the length of the fiber).

In addition to the interference from non-resonant residual light components in the launch condition, higher order spatial modes of light in the resonator may resonate or be near resonance and may alter the apparent shape of the resonance dip for the mode used for rotation sensing. For example, resonance of the higher order spatial modes of light may produce additional dips close to the resonance lineshape of the desired mode used for rotation sensing. Additionally, the second polarization state may also resonate or be near resonance and may alter the shape of the resonance dip for the other polarization mode used for rotation sensing. When these additional dips are positioned in proximity to the resonance dips associated with the resonance frequency or superimposed onto the resonance dips associated with the resonance frequency, the observed shape of the resonance dip associated with the resonance frequency may be altered. As previously mentioned, without exciting a resonance, input light that is not properly matched in the polarization mode or the spatial mode of the resonator may distort the shape of the resonance dip of the mode used for rotation sensing.

Interference from non-mode matched residual light in the launch condition having either the undesired polarization state or higher order spatial mode components of the resonator may complicate identification of the resonance centers and provide inaccurate determinations of resonance frequencies and rotations rates. Determination of the resonance centers for each of the resonance frequencies of the CW and CCW beams directly affects the rotational rate measurement and, thereby severely limits the accuracy of the RFOG.

Several mechanisms can produce imperfections in the input light polarization state, thereby producing a component of stray light at the resonator entrance that is not mode-matched. This may result from a wander of the light source polarization state or by a cross-coupling of light due to birefringence in optical elements used to direct light to the resonator entrance. The preferred state inside the resonator may not be exactly known because light inside the resonator may couple to another polarization state such that the preferred state slightly deviates from the intended state. At times, even accurate control of the input state may produce some light in a non-mode-matched condition because this light may not exactly match the light of the resonator mode. Several mechanisms may couple light into the undesired polarization state within the fiber optic resonator to produce a deviation in the intended state. Light may be cross-coupled inside the recirculating device, such as a fiber coupler or within the coil itself. Light may also excite the second polarization state, or couple into the second polarization state, of the resonator when undesirably injected into the optical fiber with a component of the light in the undesired polarization state. This may be exacerbated by possible variances in the states of polarization of the fiber inside the resonator due to temperature or stress variation, thereby making repeated light launches into one polarization state of the resonator more difficult. Even if the light beams are originally introduced to the coil of the RFOG in the first polarization mode, the optical fiber may have one or more imperfections that couple light into the second polarization mode.

In addition to encountering error mechanisms that may affect accuracy, the conventional RFOG may be cost prohibitive for high volume production, particularly for a smaller scale RFOG. The conventional RFOG is an assembly of multiple discrete components (e.g., light source, beam generator, coil, etc.) that has an associated cost for each component and for assembling such components. For smaller scale applications, the cost associated with assembling the RFOG generally increases with the increased cost for miniaturizing each discrete component and aligning the miniaturized discrete optical components.

Accordingly, it is desirable to provide a resonator gyro for small-sized navigation grade applications that attenuates resonance asymmetry errors. In addition, it is desirable to provide a method for attenuating resonance asymmetry errors in a resonator gyro while minimizing inaccuracies due to non-linear Kerr effect, stimulated Brillouin scattering, polarization errors, and bend losses associated with fiber resonator gyros based on conventional optical fiber. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Apparatus and method are provided for determining the rotational rate of an optical gyro while reducing resonance asymmetry errors. In an exemplary embodiment, an optical gyro is provided comprising a ring resonator comprising an optical fiber coil having a hollow core and first and second ends, a first optical element, a second optical element, and a filter coupled between the first and second optical elements. The ring resonator has a predetermined optical mode. The first optical element is configured to receive an input light beam and transmit a portion of the input light beam in a counter-propagating direction of the ring resonator. The portion of the input light beam enters one of the first and second ends of the optical fiber coil. The second optical element is configured to direct, together with the first optical element, a majority of a circulating light beam in the counter-propagating direction of the ring resonator and derive a transmission component of the circulating light beam at one of the first and second ends of the optical fiber coil. The circulating light beam is based on the portion of the input light beam. The transmission component indicates a resonance peak of the counter-propagating direction of the ring resonator. The ring resonator is configured to accept via the filter the portion of the input light beam having the predetermined optical mode.

In another exemplary embodiment, an optical gyro is provided comprising a ring resonator comprising an optical fiber coil having a hollow core and first and second ends, and first, second, and third optical elements. The ring resonator has a predetermined mode. The first optical element is configured to direct a portion of a first input light beam into the hollow core at the first end of the optical fiber coil and further configured to derive a first transmission component of a first circulating light beam. The second optical element is configured to direct a portion of a second input light beam into the hollow core at the second end of the optical fiber coil and further configured to derive a second transmission component of a second circulating light beam. The second circulating light beam is derived from the portion of the first input light beam having the predetermined mode. The first circulating light beam is derived from the portion of the second input light beam having the predetermined mode. The third optical element is configured to receive the first and second input light beams, transmit the portion of the first input light beam to the first optical element, transmit the portion of the second input light beam to the second optical element, direct together with the first and second optical elements a majority of the first circulating light beam in a first counter-propagating direction of the ring resonator, and direct together with the first and second optical elements a majority of the second circulating light beam in a second counter-propagating direction of the ring resonator.

In another exemplary embodiment, a method is provided for detecting a rotation rate of a ring resonator having a hollow core optical fiber coil and a mode. The method comprises directing first and second input light beams at a first optical element, removing non-mode-matched light from each of the first and second input light beams, directing a portion of the first input light beam matched with the mode into the hollow core optical fiber coil in a first counter-propagating direction of the ring resonator, directing a portion of the second input light beam matched with the mode into the hollow core optical fiber coil in a second counter-propagating direction of the ring resonator, detecting transmissive components from first and second circulating light beams, and determining a frequency shift from the transmissive components, the frequency shift representing the rotation rate. The first circulating light beam is derived from the first input light beam, and the second circulating light beam is derived from the second input light beam.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

The present invention is a resonator gyro that attenuates resonance asymmetry errors and a method for operating a resonator gyro while attenuating resonance asymmetry errors that may be produced during operation of the resonator gyro. In an exemplary embodiment, the resonator gyro includes, but is not necessarily limited to, a ring resonator, one or more mirror-reflectors, and one or more photodetectors. The components of the resonator gyro are configured in a symmetric architecture to filter out (e.g., spatially filter, polarize out, and the like) stray light (e.g., non-mode-matched light) in the ring resonator in both directions (e.g., clockwise (CW) and counter-clockwise (CCW)) prior to the light reaching a photodetector. By reducing or altogether preventing the stray light from impinging on the photodetector(s), a transmission mode resonance lineshape may be detected with reduced resonance asymmetry and bias error thereby providing a more accurate indication of a rotation rate of the resonator gyro.

Figure 1:
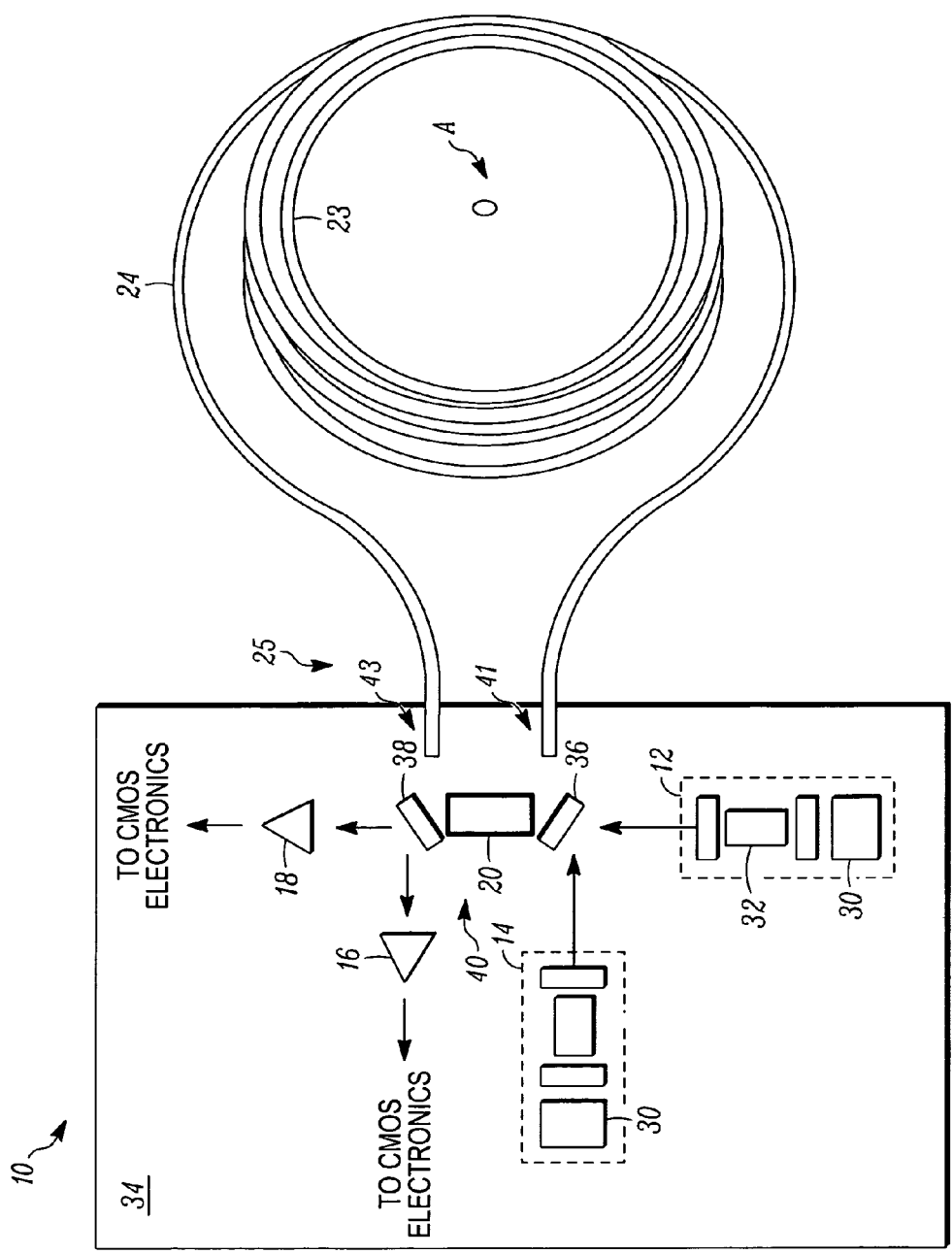
FIG. 1 is a block diagram of a resonator gyro in accordance with an exemplary embodiment of the present invention.

Referring now to the drawings, FIG. 1 is a block diagram of the resonator gyro 10 shown in FIG. 1 in accordance with another exemplary embodiment of the present invention. The resonator gyro 10 comprises tunable light sources 12, 14 (e.g., tunable lasers) that synthesize light beams (e.g., CW input light beam and CCW input light beam, respectively), a ring resonator 25 having a hollow core optical fiber coil 24 with ends 41, 43, mirror reflectors 36, 38 for introducing portions of the CW and CCW light beams from the light sources 12, 14 into the hollow core of the optical fiber 24 via the ends 43, 41 of the optical fiber 24, a filter 20 positioned between the mirror reflectors 36, 38, and photodetectors 16, 18 that receive return beams from the resonator 25. In this exemplary embodiment, the filter 20 and mirror reflector 36 operate together to minimize or altogether eliminate non-mode matched light from the circulating light beams in the resonator 25. Additionally, the photodetectors 16, 18 operate in a transmission mode and are positioned along with the filter 20 such that stray light (e.g., light that is not mode-matched with a preferred or pre-determined mode of the resonator 25) is prevented from impinging on the photodetectors 16, 18. The resonator gyro 10 may include additional mirrors and beam splitters (not shown) for directing the propagation of light beams from the light sources 12, 14 to the resonator 25 and for directing light from the resonator 25 to the photodetectors 16, 18. Additionally, the resonator gyro 10 may include signal processing electronics (e.g., CMOS electronics, not shown) for filtering, gaining, analyzing, etc., the resonance line-shapes sampled by the photodetectors 16, 18.

The optical fiber coil 24 has multiple turns that encircle an area. The mirror reflectors 36, 38 together form a recirculator 40 in the resonator 25 that reintroduces light emerging from one end of the optical fiber coil 24 into the other end of the fiber coil 24, thus causing light to propagate through the optical fiber coil 24 many times (e.g., CW and CCW circulating light beams). The filter 20 and ends 43, 41 of the hollow core optical fiber coil 24 accept light in a predetermined mode (e.g., a spatial mode, polarization mode, and the like) while substantially rejecting non-mode-matched light thereby significantly reducing the amount of stray light (e.g., non-mode-matched light) that impinges on the mirror reflector 38 and that may undesirably affect the resonance lineshapes detected by the photodetectors 18, 16.

By application of the Sagnac Effect, the resonator gyro 10 senses a rotation rate about an axis, A, of the resonator gyro 10. The photodetectors 18, 16, and subsequent signal processing electronics, detect the resonance centers of the resonance lineshapes for the CW and CCW circulating light beams, respectively, and determine the resonance frequencies associated with each of the counter-propagating directions of the resonator 25 based on the frequency shift between the detected resonance centers. The frequency shift is used to determine the rotation rate of the optical gyro 10. For example, the first light beam (e.g., a CW beam) has a frequency $f_0$ and is introduced into the resonator 25. For rotation sensing, the frequency $f_0$ of the CW beam is tuned (e.g., by tuning the frequency of the light source 12) to the resonance frequency of the resonator 25 in the CW direction. The second light beam (e.g., a CCW beam) frequency is tuned via the frequency, $f_0+\Delta f$, of the light source 14 to align the CCW beam frequency with the resonance center frequency of the resonator 25 in the CCW direction.

In one exemplary embodiment, each of the light sources 12, 14 is an external cavity semiconductor laser having a laser diode 32 (e.g., a Fabry-Perot laser diode), an external reflector or reflectors, and an electronic drive 30 for modulating and tuning the frequency of the light beam produced by the laser diode 32, as well as controlling the intensity thereof. The light sources 12, 14 may additionally include a frequency-selective element and focusing lenses or elements to produce a narrow line-width light beam having a single pre-determined frequency in a spatially desirable output. The light beam produced by the first tunable laser 12 is tuned to a frequency $f_0$, and the light beam produced by the second tunable laser 14 is tuned to a frequency $f_0+\Delta f$. The relative frequency drift and jitter between the two laser frequencies is preferably substantially minimized to a level that minimizes or does not affect the accuracy and stability of the frequency shift, and thus rotational rate, measurement. This can be accomplished by a laser frequency stabilization technique using electronic servos to lock their beat frequencies to a tunable stable offset that is proportional to rotational rate. Each of the tunable light sources 12, 14 may sinusoidally frequency modulate the corresponding generated light beam.

In another embodiment, the resonator 25 may additionally include a piezoelectric transducer (PZT) hub 23 to modulate the resonance frequencies of the resonator 25. In one embodiment, the optical fiber coil 24 encircles the PZT hub 23, and thus the diameter of the PZT hub 23, and the PZT hub 23 sinusoidally stretches the optical fiber coil 24 at a predetermined modulation frequency. The recirculator 40 introduces the light beams (e.g., CW and CCW input light beams) into the hollow core and circulates a portion of the light beams through the optical fiber coil 24. The recirculator 40 reintroduces light emerging from one end of the optical fiber coil 24 into the other end of the fiber coil 24, thus causing light to propagate through the fiber coil 24 many times. In an alternative embodiment, the PZT hub 23 is omitted from the resonator 25 and the recirculator 40 introduces modulated input light beams (e.g., modulated by the tunable lasers 12, 14) into the hollow core of the optical fiber coil 24 and circulates a portion of the modulated light beams through the optical fiber coil 24.

The ring resonator 25 receives CW and CCW input light beams at an input (e.g., the mirror reflector 36), circulates a portion of these input light beams, and produces reflected light components, which are derived from a combination of components from the input light beams and the circulating light beams, at the input of the ring resonator 25. For convenience of explanation, the term input light beam refers to the light provided to the ring resonator 25, and the term circulating light beam refers to the light traveling in the optical fiber coil 24 of the ring resonator 25 that has traveled through the optical fiber coil 24 at least once.

A first mirror reflector 36 receives the modulated light beams (e.g., CW and CCW input light beams) from the light sources 12, 14, partially transmits a portion of the CCW input light beam into a first end 41 of the optical fiber coil 24, and partially transmits a portion of the CW input light beam to the filter 20. A second mirror reflector 38 introduces a portion of the CW input light beam from the filter 20 into a second end 43 of the optical fiber coil 24 and derives (with low loss) transmission mode components from the CW and CCW light beams traveling in the optical fiber coil 24. The recirculator 40, which in this exemplary embodiment includes the filter 20, reintroduces light emerging from one end of the optical fiber coil 24 into the other end of the fiber coil 24, thus causing light to propagate through the fiber coil 24 many times.

The filter 20 has a predetermined spatial mode that assists in defining the modes of the resonator 25 and provides a discriminating filter that predominantly accepts light having the predetermined spatial mode in the CW input light beam while rejecting light in other spatial distributions of light in the CW input light beam. The filter 20 may also, but not necessarily, reject light that is not matched to the polarization of the resonator mode. In one exemplary embodiment, the filter 20 is a segment of hollow core optical fiber having substantially the same optical characteristics as the optical fiber coil 24. In this example, because the mode of the filter 20 is substantially the same as the mode of the resonator 25 and the spatial distribution of the preferred mode of the filter 20 is tightly confined, the filter 20 accepts light that is matched to the mode of the resonator 25. This accepted light is mode-matched with the mode of the filter 20 and with the mode of the resonator 25 and propagates in this mode while stray light (e.g., light that is not matched with the mode of the filter 20 nor with the mode of the resonator 25) is prevented from impinging on the mirror reflector 38, impinging on the photodetector 18, and from subsequently entering the second end 43 of the hollow core optical fiber coil 24.

A CCW input light beam produced by the light source 14 is partially transmitted by the mirror reflector 36 to the first end 41 of the hollow core optical fiber coil 24, and the first end 41 of the hollow core optical fiber coil 24 accepts light of the CCW input light beam that excites a predetermined (e.g., a desired) mode of the resonator 25 while rejecting other light in the CCW input light beam that does not excite at this mode of the resonator 25. This accepted light is mode-matched to the mode of the resonator 25 and propagates in this mode while stray light is prevented from entering the first end 41 of the optical fiber coil 24 and eventually reaching the photodetector 16.

Thus, light emerging from the ends 41, 43 of the hollow core optical fiber coil 24 and impinging on the mirror reflector 38 is mode-matched to the mode of the resonator 25 and propagates in this mode while stray light (e.g., non-mode-matched light) is prevented from impinging on the mirror reflector 38 and on the detectors 18 and 16 by the filter 20 and the first end 41 of the hollow core optical fiber coil 24.

With the ends 41, 43 of the hollow core optical fiber coil 24 coupled to the recirculator 40, the mirror reflectors 36, 38 circulate portions of the CW and CCW light beams through the optical fiber coil 24. For example, the first mirror reflector 36 directs a CW circulating light beam from the first end 41 of the optical fiber coil 24 to the filter 20, which directs the CW circulating light beam to the second mirror reflector 38, and the second mirror reflector 38 directs the CW circulating light beam to the second end 43 of the optical fiber coil 24. The second mirror reflector 38 directs a CCW circulating light beam from the second end 43 of the optical fiber coil 24 to the filter 20, which directs the CCW circulating light beam to the first mirror reflector 36, and the first mirror reflector directs the CCW circulating light beam to the first end 41 of the optical fiber coil 24.

The mirror reflector 38 derives (with low loss) transmission mode components from the CW and CCW light beams traveling in the optical fiber coil 24. Transmission mode components are based on a sample of the input light beams that are tuned to the CW and CCW resonances of the ring resonator 25 and substantially solely derived by sampling the circulating beams at an output (e.g., the mirror reflector 38) of the ring resonator 25. The ring resonator 25 is configured to partially transmit a component of the circulating beams (i.e., transmission mode components), at the output of the ring resonator 25, from the light circulating in the ring resonator 25. The light that is transmitted, or transmission mode components, are thus originally derived from input light that has properly matched the predetermined mode (e.g., the mode of the hollow core optical fiber coil 24 and filter 20) of the ring resonator 25.

In an exemplary embodiment, the ring resonator configuration shown in FIG. 1 allows for a sampling of the light circulating inside the ring resonator 25 to provide transmission mode components (i.e., of the light circulating in the ring resonator 25) that match a single polarization mode (e.g., selected from S-polarization and P-polarization) and/or a preferred spatial mode (e.g., usually the lowest order mode) of the ring resonator 25. A component of the circulating light beams also remains in the ring resonator 25, and a portion of these are contained within the reflected beam components at the input of the ring resonator 25. The reflected beam components are superpositions of a portion of light that decays from the circulating light in the resonator 25 and the input light that is reflected at the mirror 36 and prevented from propagating inside the fiber coil 24, which includes light that is not properly mode-matched into the input of the resonator 25.

The second mirror reflector 38 may be selected to have a transmission mode that favors one polarization mode (e.g., selected from one of S-polarization and P-polarization) of the light circulating in the ring resonator 25. The transmission mode components are derived from light circulating in the ring resonator 25, and thus inherently consist of the desired polarization state and spatial mode that is made to propagate and resonate within the resonator 25. The second mirror reflector 38 transmits these transmission mode components to the photodetectors 16, 18.

The photodetectors 16, 18 sample portions of the CW and CCW circulating light beams and are each coupled to additional circuits (e.g., CMOS based resonance tracking circuits) for analyzing the resonance line-shapes associated with CW and CCW circulating light beams. The photodetectors 16, 18 detect a resonance peak from the transmission mode component of each of the counter-propagating directions (e.g., CW and CCW) of light circulating in the ring resonator 25, and the center of the resonance peak corresponds to a resonance frequency of a particular counter-propagating direction. A frequency shift between the resonance frequency of the CW direction and the resonance frequency of the CCW direction indicates the rotational rate of the resonator gyro 10. In an exemplary embodiment, the CMOS electronics are be coupled to the light sources 12, 14 to affect closed loop tracking of the light frequencies to the resonance frequencies of the resonator 25.

To measure the resonance center-frequencies in either the CW direction or CCW direction, a standard synchronous detection technique is used. Each input light beam is sinusoidally phase-modulated, and therefore frequency modulated at frequencies $f_m$ and $f_n$, respectively, to dither each input beam frequency across a resonance line-shape as measured by the photodetectors 18, 16. For example, additional circuitry (e.g., the CMOS electronics) coupled to the photodetectors 18, 16 may demodulate the output of the photodetectors 18, 16 at the frequencies $f_m$ and $f_n$, respectively, to measure resonance centers indicated by the light outputs of the CW and CCW circulating light beams. At the line centers of the resonance line-shapes, or the resonance centers, the photodetectors 18 and 16 detect a minimum output at the fundamental frequencies $f_m$ and $f_n$, respectively. When the input beam frequency (e.g., $f_0 + \Delta f$ or $f_0$) is off-resonance, an error signal at frequencies $f_m$ and $f_n$, respectively, is sensed by the photodetector and used to tune the respective beam frequency to the respective resonance frequency of the resonator 25. The frequency of the CW beam is tuned by changing the frequency, $f_0$, of the light source 12 and the frequency of the CCW beam is adjusted via a feedback loop that changes the frequency shift, $\Delta f$, of the light source 14 so that $f_0+\Delta f$ matches the CCW resonance frequency of the resonator 25.

When $f_0$ is tuned away from the resonance frequency of the resonator 25 in the CW direction, the energy from the CW input light beam does not enter the optical fiber and the light energy is reflected at the first mirror reflector 36. When $f_0$ is tuned to the resonance frequency of the resonator 25 in the CW direction, the mode-matched portion of the CW beam enters the optical fiber coil 24 having a spatially- and polarization-matched mode with the resonator 25, which in turn causes the CW beam striking the mirror reflector 38 to have a maximum output, i.e., a resonance peak, thereby indicating the resonance center. Similarly for the CCW circulating light beam, the energy in the mode-matched portion of the CCW circulating light beam enters the optical fiber coil 24 when the CCW input light beam is tuned to the resonance frequency of the resonator 25 in the CCW direction, having a spatially- and polarization-matched mode with the resonator 25, which in turn causes the CCW beam striking the mirror reflector 38 to have a maximum output.

In the absence of rotation, the round-trip path-lengths of the CW and CCW beams inside the resonator 25 in the CW and CCW direction, respectively, are substantially equal. Thus, $\Delta f$ is tuned to zero. In the presence of rotation, the round-trip path-lengths differ between the CW and the CCW directions producing a resonance frequency difference between the two directions that is proportional to the rotation rate. By tuning the frequency $f_0$ to track the CW resonance and the frequency $\Delta f$ to track the CCW resonance center, the rotation rate is determined.

Although the resonator gyro 10 supplies a second light wave, frequency-shifted by $\Delta f$, by means of tuning the second light source 14, a single light source may alternatively be used. For example, the light output from a single light source may be split to form the two input beams. In this example, one of these two input beams is frequency shifted using a frequency shifter. Two methods of accomplishing a frequency shift, without a second light source, include the use of an acousto-optic frequency shifter and the use of a phase modulator with a serrodyne modulation waveform. In the latter method, the serrodyne waveform is a form of a sawtooth waveform. To apply a relatively pure frequency shift, the phase shift amplitude of the sawtooth waveform is set to an integer multiple of $2\pi$, and the sawtooth waveform has a substantially fast flyback time when compared to its period. In an exemplary embodiment, frequency shifting is obtained using the serrodyne method whereby a phase ramp is applied to an input light beam (e.g., CW or CCW beam). By driving a phase modulator (not shown) with a continuous and linear phase ramp, a frequency shift may be obtained, that is proportional to the slope of the phase ramp. A sawtooth waveform having a $2\pi$ phase height and a frequency $\Delta f$ produces substantially equivalent results as the continuous ramp, and the sawtooth frequency ($\Delta f$) is adjusted to track the CCW resonance in the presence of rotation. A frequency shifter (not shown) may apply a relatively pure frequency shift when the sawtooth waveform flyback time is substantially fast compared to the waveform period. The polarity of the phase ramp is reversed for an opposite direction of rotation.

The CW and CCW beams propagate through a hollow core, band-gap, optical fiber having an extremely low bend loss, and the coil 24 preferably has a large number of turns about a substantially small area to achieve a compact gyro which is one advantage of this invention. For example, the coil 24 may have from about 20-40 turns of the optical fiber about a one centimeter diameter. The hollow core optical fiber is typically glass-based with a plastic outer jacket and a hollow inner core. In the hollow core optical fiber, light injected from the recirculator 40 traverses mostly through free space (e.g., air or a vacuum) along the core, and only about a few percent or less of the optical energy of light is contained in the glass walls of the fiber surrounding the hollow core. Because a large majority of the light energy traverses through free space along the hollow core of optical fiber, the transition between the recirculator 40 and the hollow core optical fiber has a near-perfect index matching, and a high reflectivity laser mirror with low loss and attractive polarization properties may be used for the recirculator 40. The hollow core fiber is suited to significantly attenuate, or eliminate altogether, the rotation measurement errors commonly associated with the properties of the glass medium in the core of conventional fibers.

The most preferred hollow fiber properties are low loss, tight bend radii, high reliability, minimal number of spatial modes (e.g., ideally one spatial mode), and a maximum degree of polarization preservation. In the case of spatial modes, it is preferable to minimize losses and secondary undesirable resonances that result from the excitation of modes (e.g., higher order modes) that have different spatial distributions of light in the fiber. The excitation of these secondary resonances can cause apparent distortions of the line-shapes of the main CW and CCW resonances used for measuring rotation and, thus, rotation rate errors. It is also preferable to minimize other types of spatial mode distributions in the fiber, such as surface modes, in which light can be distributed on the surface of the walls or within the walls surrounding the hollow core of the fiber. In this case, the excitation of surface modes may cause light loss, spurious errors, excess noise, or drift.

The recirculator 40 may additionally comprise at least one polarization unit (not shown) that attenuates light emerging from the optical fiber coil 24 having an undesired polarization state while minimizing losses of a desired polarization state in the light circulating within the resonator 25. The polarization unit reflects light in the desired polarization state (e.g., S-polarization) back into the optical fiber coil 24 to a substantially high degree (e.g., about 95% or more) and passes light in the undesired polarization state (e.g., P-polarization) out of the resonator 25 (e.g., removes light in the undesired polarization state from the light recirculating in the resonator 25) to a substantially high degree. The recirculator 40 may comprise a single polarization unit to receive/reflect light exiting from the ends of the optical fiber coil 24 or may comprise a network of two or more polarization units to separately receive/reflect light exiting from each end of the optical fiber coil 24.

In an exemplary embodiment, the polarization unit has a Brewster angle of incidence (e.g., about 56°), for light impinging on the main surface (e.g., the surface receiving light exiting from the optical fiber coil 24) of the polarization unit, at which S-polarized light is reflected at a substantially high degree and P-polarized light is passed out of the ring resonator 25 at a substantially high degree. In this exemplary embodiment, the polarization unit preferably receives light from the ends of the optical fiber coil 24 at this Brewster angle of incidence. One example of the polarizing unit is a thin film polarizer that comprises a glass substrate having a coating (e.g., a stack of dielectric coatings), although a variety of other reflective devices having polarization sensitivity may be used. In conjunction with the hollow core optical fiber, light circulating in the optical fiber coil 24 having the desired polarization may have a significantly low loss when propagating from the hollow core fiber into free space and then reflected by the polarization unit. Additionally, by using hollow core fiber that substantially maintains the state of polarization of light, or high birefringence hollow core optical fiber, the polarization state of the light inside the optical fiber may be oriented and maintained relative to the polarization state of the light reflected by polarization unit. Thus, losses associated with the desired polarization state are minimized, and the error in the rotation rate measurement due to the resonance magnitude of the undesired polarization state may be minimized. Further, the use of hollow core fiber significantly reduces the temperature dependence of the birefringence which allows for a stable resonance frequency separation between the desired polarization state and the residual undesired polarization state. Consequently, the use of hollow core fiber reduces errors in rotation rate over a wider variety of environmental conditions. Light guiding hollow core fiber may be realized via an optical bandgap effect in photonic crystal fiber structures and is frequently referred to as bandgap fiber.

In this exemplary embodiment, some of the components (e.g., light sources 12, 14, mirror reflectors 36, 38, photodetectors 16, 18, and CMOS electronics) of the resonator gyro 10 are formed on or mounted on a silicon optical bench 34. For example, the mirror reflectors 36, 38 are mounted on the silicon optical bench 34, and the ends 41, 43 of the optical fiber 24 are coupled to the silicon optical bench 34 (e.g., via V-shaped groves formed on the silicon optical bench 34). Although the resonator gyro 10 is described in the context of a silicon optical bench 34, a variety of substrates may be used including, but not necessarily limited to silicon, silicon-on-insulator, InGaAsP, and the like. Using miniature optical bench techniques, a variety of precision optical structures may be etched or formed on the surface of the silicon optical bench 34, and external optical components may be precisely mounted on the surface of the silicon optical bench 34 or formed on the silicon optical bench 34. Additional material layers may be formed above a base layer of the silicon optical bench 34. For simplicity of discussion, the term substrate includes additional material layers that may be formed above the base layer of the substrate.

Figure 2:
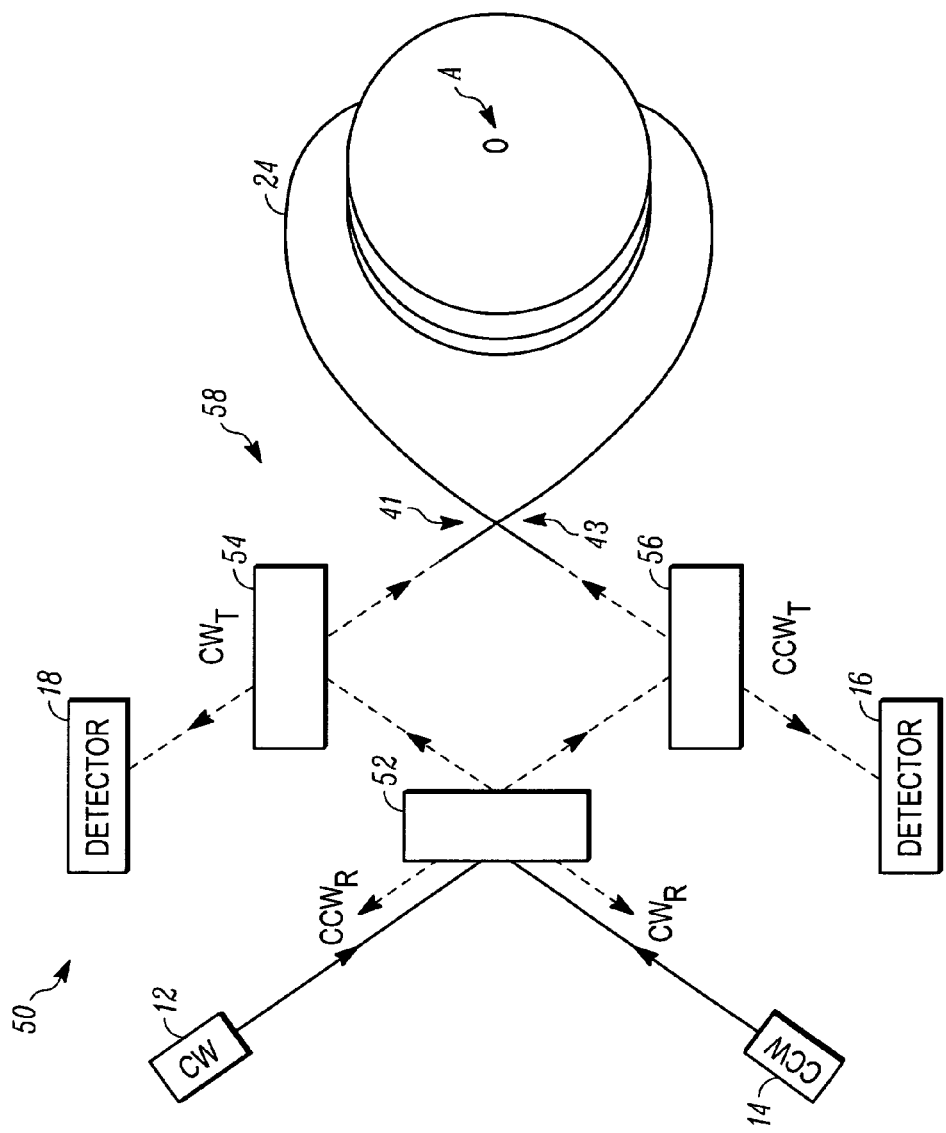
FIG. 2 is a block diagram of a resonator gyro in accordance with another exemplary embodiment of the present invention.

FIG. 2 is block diagram of a resonator gyro 50 in accordance with another exemplary embodiment of the present invention. The resonator gyro 50 comprises the tunable light sources 12, 14 that synthesize the CW and CCW input light beams, respectively), a ring resonator 58 having the hollow core optical fiber coil 24 with ends 41, 43, shown in FIG. 1, a first mirror reflector 52 for receiving the CW and CCW input light beams, and second and third mirror reflectors 56, 54 for introducing portions of the CW and CCW input light beams from the first mirror reflector 52 into the hollow core of the optical fiber 24 via the ends 43, 41 of the optical fiber 24, and the photodetectors 18, 16, shown in FIG. 1, that sample circulating beams (e.g., the transmission components of the CW circulating light beam ($CW_T$) and CCW circulating light beam ($CCW_T$)) from the ring resonator 58. In this exemplary embodiment, the mirror reflectors 52, 54, and 56 are selected to have optical properties and oriented so as to minimize or altogether eliminate non-mode matched light from the circulating lights in the ring resonator 58 and from being received by the photodetectors 18, 16.

The resonator gyro 50 may include additional mirrors and beam splitters (not shown) for directing the propagation of light beams from the tunable lasers 12, 14 to the ring resonator 58 and for directing light from the ring resonator 58 to the photodetectors 16, 18. Additionally, the resonator gyro 50 may include signal processing electronics (e.g., CMOS electronics, not shown) for filtering, gaining, analyzing, etc., the resonance line-shapes sampled by the photodetectors 16, 18. Some of the components (e.g., the light sources 12 and 14, mirror reflectors 52, 54, and 56, and photodetectors 16 and 18) of the resonator gyro 50 may also be formed on a silicon optical bench.

The ring resonator 58 receives the CW and CCW input light beams at the input (e.g., the mirror reflector 52), circulates a portion of these input light beams, and produces reflected light components ($CW_R$ and $CCW_R$), at the input of the ring resonator 52, which are derived from a combination of components from the input light beams and the circulating beams. The transmission mode components ($CW_T$ and $CCW_T$) are based on a sample of the circulating light beams which are derived from portions of the input light beams that are tuned to the CW and CCW resonances of the ring resonator 58 and substantially solely derived by sampling the circulating beams at the output (e.g., the mirror reflectors 54, 56) of the ring resonator 58. The ring resonator 58 is configured to partially transmit a component of the circulating beams (i.e., transmission mode components), at the output of the ring resonator 58, from the light circulating in the ring resonator 58. The light that is transmitted, or transmission mode components, are thus originally derived from input light that has properly matched a predetermined mode of the ring resonator 58.

In an exemplary embodiment, the ring resonator configuration allows for sampling of the light circulating inside the ring resonator 58 to provide transmission mode components ($CW_T$ and $CCW_T$) from the light circulating in a preferred mode of the ring resonator 58 that match a single polarization mode of the ring resonator 58 (e.g., selected from S-polarization and P-polarization) and/or a preferred spatial mode (e.g., usually the lowest order mode) of the ring resonator 58. A component of the circulating light beams also remains in the ring resonator 58 and a portion of these are contained within the reflected beam components ($CW_R$ and $CCW_R$) at the input (e.g., the mirror 52) of the ring resonator 58. The reflected beam components ($CW_R$ and $CCW_R$) are superpositions of a portion of light that decays from the circulating light in the ring resonator 58, and input light that is reflected at the mirror 52 and prevented from propagating inside the fiber coil 24, which includes input light that is not properly mode-matched into the input of the resonator 25.

The portions of the CW and CCW input light beams transmitted from the mirror reflector 52 to the mirror reflectors 56, 54 may contain a slight amount of stray light (e.g., non-mode-matched light). In this case, the mirror reflectors 54, 56 direct the stray light components that may reside in the portions of the CW and CCW input light beams either toward the fiber coil 24 or transmitted out of the resonator 25, but in either case, they are deliberately directed away from the photodetectors 18, 16. However, light that is not mode-matched to the resonator 25 does not match the resonator mode and is therefore prevented from entering the predetermined mode of the resonator 25, which is similar to the predetermined mode of the fiber coil 24 at points within the fiber coil 24. A significant amount of the stray light (e.g., the non-mode-matched light) in the input light beams is thus removed (e.g., not detected) by the detector arrangement and the mirror reflector arrangement (e.g., the orientation of the mirror reflectors 54, 56, in conjunction with the mirror reflector 52). The reduction in the amount of stray light that is received by the photodetectors 16, 18 results in a reduction or elimination of the undesirable effects of the resonance line-shape asymmetries that may be detected by the photodetectors in conventional resonator configurations.

Additionally, the mirror reflectors 54, 56 may be selected to have a transmission mode that favors one polarization mode (e.g., selected from one of S-polarization and P-polarization)

of the light circulating in the ring resonator 58. The transmission mode components are derived from light circulating in the ring resonator 58, and thus inherently consist of the desired polarization state and spatial mode that is made to propagate and resonate within the resonator 58. The mirror reflector 54 transmits the transmission mode component ($CW_T$) of the CW circulating light beam to the photodetector 18, and the mirror reflector 56 transmits the transmission mode component ($CCW_T$) of the CCW circulating light beam to the photodetector 16. With the mirror reflector 52 initially reflecting a majority of the non-mode matched light in the input light beams and the mirror reflectors 54 and 56 together subsequently being configured so that the remaining stray light is directed away from the photodetectors 18 and 16, the resonance line-shape asymmetries that may be present in the transmission mode components of the circulating light beams received by the photodetectors 18, 16 are significantly reduced.

Figure 3:
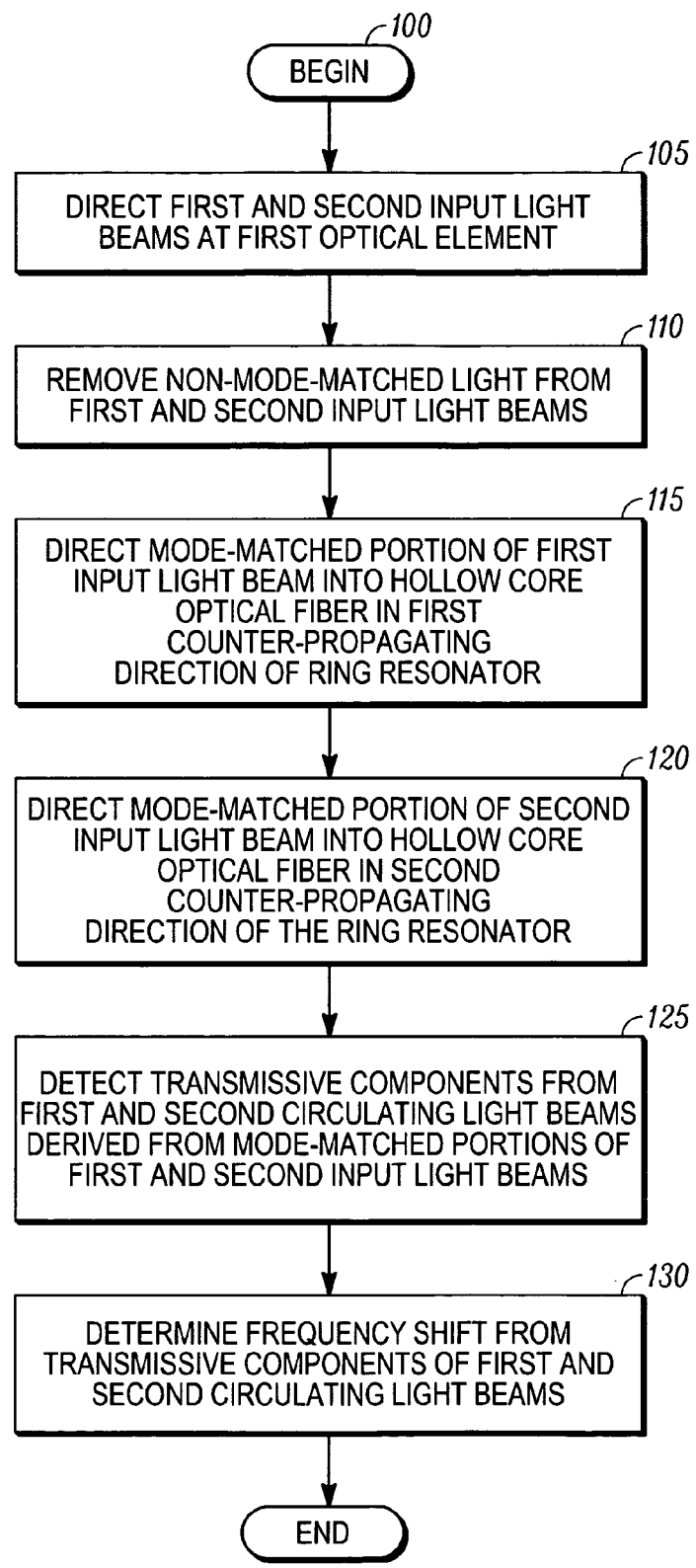
FIG. 3 is a flow diagram of a method for detecting a rotation rate of a resonator gyro in accordance with an exemplary embodiment of the present invention.

FIG. 3 is a flow diagram of a method 100 for detecting a rotation rate of a resonator gyro in accordance with an exemplary embodiment of the present invention. The resonator gyro has a ring resonator, a hollow core fiber coil, and a predetermined mode (e.g., a polarization mode, a spatial mode, a combination of one or more modes, or the like) based on the ring resonator. First and second input light beams (e.g., CCW and CW input light beams) are directed at an input of the ring resonator, such as a first optical element (e.g., the mirror reflector 36 and the mirror reflector 52), as indicated at step 105. Non-mode-matched light is removed from each of the first and second input light beams, as indicated at step 110. The light in the first and second input light beams having the mode (e.g., spatial mode and/or the polarization mode) of the ring resonator is accepted into the ring resonator.

In one exemplary embodiment, the mirror reflector 36 partially transmits a portion of the CCW input light beam to one end 41 of the hollow core optical fiber coil 24 and partially transmits a portion of the CW input light beam to the filter 20. The filter 20 has a predetermined spatial mode and accepts light of the CW input light beam having the predetermined spatial mode while rejecting light in other spatial distributions of light of the CW input light beam from the mirror reflector 36. The filter 20 may be a segment of hollow core optical fiber having substantially the same optical characteristics as the fiber coil 24. Because the mode of the filter 20 is tightly confined and because the mode of the filter 20 is substantially the same as the mode of the resonator 25 at points within the resonator 25, the filter 20 accepts light that is matched to the mode of the resonator 25 while preventing stray light from impinging on the mirror reflector 38. The mirror reflector 38 then introduces this accepted light from the filter 20 to the end 43 of the fiber coil 24.

In another exemplary embodiment, the mirror reflector 52 reflects light of the CW and CCW input light beams that are not properly mode-matched into the input of the ring resonator 58 and prevents this light from propagating inside the fiber coil 24. Portions of the CCW and CW input light beams transmitted to the mirror reflectors 54, 56, respectively, may contain a slight amount of stray light (e.g., non-mode matched light). The mirror reflectors 54 and 56 direct the stray light components that may reside in the portions of the CCW and CW input light beams away from the photodetectors 18, 16 and away from the ends 41, 43 of the fiber coil 24.

A portion (i.e., the mode-matched portion) of the first input light beam is accepted into the hollow core optical fiber coil in a first counter-propagating direction of the ring resonator, as indicated at step 115. For example, the mode-matched portion of the CW input light beam is directed by the mirror reflector 38 into the end 43 of the hollow core of the optical fiber coil 24. In another example, the mode-matched portion of the CW input light beam is directed by the mirror reflector 56 into the end 43 of the hollow core of the optical fiber coil 24. This portion of the first input light beam is matched with the mode of the resonator. The mode-matched portion of the second input light beam is accepted into the hollow core optical fiber coil in a second counter-propagating direction of the ring resonator, as indicated at step 120. For example, light of the CCW input light beam transmitted from the mirror reflector 36 that excites the predetermined mode of the ring resonator 25 is accepted by the end 41 of the hollow core optical fiber coil 24, while light in the CCW input light beam that does not excite at this predetermined mode is rejected at the end 41 of the fiber coil 24. In another example, light of the CCW input light beam directed by the mirror reflector 54 to the end 43 of the hollow core optical fiber coil 24 that excites the predetermined mode of the ring resonator 58 is accepted by the end 43 of the fiber coil 24.

Transmission mode components are detected from first and second circulating light beams, as indicated at step 125. The first circulating light beam (e.g., the CW circulating light beam) is derived from light in the first input light beam (e.g., the CW input light beam) that is mode-matched with the mode of the ring resonator, and the second circulating light beam (e.g., the CCW circulating light beam) is derived from light in the second input light beam (e.g., the CCW input light beam) that is mode-matched with the mode of the ring resonator. For example, the mode-matched portion of the CW input light beam is circulated through the hollow core optical fiber 24 in the CW direction to produce the CW circulating light beam, and the mode-matched portion of the CCW input light beam is circulated through the hollow core optical fiber 24 in the CCW direction to produce the CCW circulating light beam.

A frequency shift is detected from the transmission mode components of the first and second circulating light beams, as indicated at step 130. The frequency shift is directly proportional to the rotation rate.

Potential advantages of the resonator gyros 10 and 50 include, but are not limited to: a capability of providing a high-accuracy rotation sensor in a low-cost, small-sized package; a resonator having less than a few meters of fiber wound into tight turns with low loss; use of a high reflectivity mirror rather than a fiber optic coupler to recirculate light in the ring resonator; a compact, stable laser whose key components are mounted on a silicon optical bench; minimized non-linear effects in silica fibers that may promote gyro errors; substantial reduction of light loss at transition point to optical fiber coil 24; a capability of winding the optical fiber coil into a very tight (e.g., pencil diameter) loops with little to no change in light transmission properties.

In an exemplary embodiment, the resonator gyros 10 and 50 are constructed on a silicon-based micro-optical bench that integrates electronics and optics and provides an efficient, expedient, and mechanically stable interface between the two. Miniature optical components having a feature size of as little as 10 microns may be mounted on silicon surfaces to eliminate large bulk optics, even though the light wave may be traveling in free space. Laser diodes and external elements for stabilizing their frequency may also be mounted on the top surface of the silicon optical bench. In this exemplary embodiment, the laser diodes and related frequency tuning components may be mounted on the optical bench. Several features of external-cavity lasers may be placed or directly formed on the silicon chip. The resonator gyros 10 and 50 use progressively narrower spectral-width lasers to improve the signal to noise accuracy. As such, some conventional laser diodes possess excessively wider linewidths, creating the need to narrow this linewidth by placing such laser diodes in an external cavity. This can be compactly accommodated on the silicon substrate by forming or placing high reflectivity mirrors on the substrate and inserting a laser diode in between such mirrors. Thus, a compact external cavity, narrow linewidth laser diode may be produced.

Further, the laser diode preferably emits light at a single frequency. A frequency selective element may be inserted into the external cavity to create more loss for undesired emission frequencies and cause the laser to emit light of narrow linewidth at only a single center wavelength. There are many frequency selective elements that may be used. For example, the frequency selective element may be a miniature grating, either formed or placed on the substrate, or an etalon formed or placed on the grating. Other features of the resonator gyro may be realized on the silicon substrate. For example, the mirror-recirculators may be placed, formed, or etched on the surface and may be aligned to the fibers by locating fibers in precisely formed and positioned V-grooves. The detectors may also be precisely positioned to the resonator output beams using planar lithographical processes to locate mounting features for placing detectors on the surface. Alternatively, the detectors may be formed on the surface by doping silicon with a dopant, such as germanium for detector operation at about 1.3 µm or about 1.5 µm wavelengths. Even the laser diode may be integrated on the silicon platform, such as by using hybrid techniques to grow doped InGaAsP layers on silicon (e.g., using a secondary substrate to facilitate the formation of doped InGaAsP layers on the silicon surface). The use of these techniques allows the fabrication of optics in a silicon platform and thus integrated with the electronics.

The resonator gyros 10 and 50 are suited to a variety of applications including, by way of example and not of limitation, applications requiring inertial guidance such as aircraft, land vehicle, submarine, satellite, surface ship navigation, and the like. In addition, the relatively small size envisioned for the resonator gyros 10 and 50 would enable a practical usage on very small platforms including, by way of example and not of limitation, small robots, individual soldier footwear, and small-scale satellites.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An optical gyro comprising:
  a ring resonator having a predetermined optical mode configured to circulate light beams in counter-propagating directions, said ring resonator comprising an optical fiber coil having a hollow core and first and second ends;
  a first optical element configured to:
    receive an input light beam; and
    transmit a portion of said input light beam in a counter-propagating direction of the ring resonator, said portion of said input light beam entering one of said first and second ends of said optical fiber coil;
  a second optical element configured to:
    direct together with said first optical element a majority of a circulating light beam in said counter-propagating direction of the ring resonator, said circulating light beam based on said portion of said input light beam; and
    derive a transmission component of said circulating light beam at one of said first and second ends of said optical fiber coil, said transmission component indicating a resonance peak of said counter-propagating direction of the ring resonator; and
  a filter coupled between said first and second optical elements, said ring resonator configured to accept via said filter said portion of said input light beam having said predetermined optical mode.

2. An optical gyro according to claim 1, wherein said filter comprises a hollow core optical fiber.

3. An optical gyro according to claim 1, wherein said predetermined optical mode is a spatial mode.

4. An optical gyro according to claim 1, wherein said predetermined optical mode is a polarization mode.

5. An optical gyro according to claim 1, wherein said first optical element is further configured to transmit said portion of said input light beam into said hollow core at said first end, said portion of said input light beam matched with said predetermined optical mode;
  wherein said second optical element is further configured to:
    direct a majority of said circulating light beam from said second end to said filter; and
    derive said transmission component from said circulating light beam at said second end; and
  wherein said filter is further configured to direct said majority of said circulating light beam to said first optical element.

6. An optical gyro according to claim 1, wherein said input light beam comprises first and second input light beams; wherein said first optical element is further configured to:
    transmit a portion of said second input light beam to said filter in a second counter-propagating direction;
    direct together with said second optical element a majority of a second circulating light beam in said second counter-propagating direction of said ring resonator, said second circulating light beam based on said second input light beam; and
    direct a majority of said second circulating light beam from said first end to said filter;
  wherein said filter is further configured to:
    produce a filtered light beam matched with said predetermined optical mode from said portion of said input light beam; and
    direct said filtered light beam to said second optical element; and
  wherein said second optical element is further configured to derive a second transmission component from said majority of said second circulating light beam.

7. An optical gyro according to claim 1, wherein said input light beam has a frequency and said counter-propagating direction has a resonance frequency, and wherein said second optical element is further configured to derive said transmission component when said frequency of said input light beam is tuned to said resonance frequency.

8. An optical gyro comprising:
  a ring resonator having a predetermined mode and comprising an optical fiber coil having a hollow core and first and second ends;
  a first optical element configured to direct a portion of a first input light beam into said hollow core at said first end of said optical fiber coil and further configured to derive a first transmission component of a first circulating light beam; and
  a second optical element configured to direct a portion of a second input light beam into said hollow core at said second end of said optical fiber coil and further configured to derive a second transmission component of a second circulating light beam, said second circulating light beam derived from said portion of said first input light beam having said predetermined mode, said first circulating light beam derived from said portion of said second input light beam having said predetermined mode; and a third optical element configured to:
    receive said first and second input light beams;
    transmit said portion of said first input light beam to said first optical element;
    transmit said portion of said second input light beam to said second optical element;
    direct together with said first and second optical elements a majority of said first circulating light beam in a first counter-propagating direction of the ring resonator; and
    direct together with said first and second optical elements a majority of said second circulating light beam in a second counter-propagating direction of the ring resonator.

9. A ring resonator according to claim 8, wherein said predetermined mode is a spatial mode.

10. A ring resonator according to claim 8, wherein said predetermined mode is a polarization mode.

11. A ring resonator according to claim 8, wherein each of said first and second input light beams comprises a non-mode-matched light portion; and wherein said third optical element is further configured to reflect a majority of said non-mode-matched light portion of said first and second input light beams.

12. A ring resonator according to claim 8, wherein each of said first and second input light beams comprises a non-mode-matched light;
    wherein said first optical element is further configured to:
        pass a majority of said non-mode-matched light portion of said first input light beam; and
        separate said first transmission component of said first circulating light beam from said majority of said non-mode-matched light portion of said first input light beam; and
    wherein said second optical element is further configured to:
        pass a majority of said non-mode-matched light portion of said second input light beam; and
        separate said second transmission component of said second circulating light beam from said majority of said non-mode-matched light portion of said second input light beam.

13. A ring resonator according to claim 12 further comprising:
    a first photodetector for sampling a portion of said first transmission component from said first optical element; and
    a second photodetector for sampling a portion of said second transmission component from said second optical element.

14. A method for detecting a rotation rate of a ring resonator having a predetermined mode and counter-propagating directions, the method comprising the steps of:
    directing first and second input light beams at a first optical element;
    removing non-mode-matched light portions from each of the first and second input light beams;
    directing a portion of the first input light beam into a hollow core optical fiber coil in a first counter-propagating direction of the ring resonator, the portion of the first input light beam matched with the predetermined mode of the ring resonator;
    directing a portion of the second input light beam into the hollow core optical fiber coil in a second counter-propagating direction of the ring resonator, the portion of the second input light beam matched with the predetermined mode of the ring resonator;
    detecting transmissive components from first and second circulating light beams, the first circulating light beam derived from the first input light beam, the second circulating light beam derived from the second input light beam; and
    determining a frequency shift from the transmissive components of the first and second circulating light beams, the frequency shift representing the rotation rate.

15. A method according to claim 14, wherein the ring resonator has first and second counter-propagating directions; and wherein the method further comprises:
    prior to said step of detecting, circulating the first circulating light beam through the ring resonator in the first counter-propagating direction; and
    prior to said step of detecting, circulating the second circulating light beam through the ring resonator in the second counter-propagating direction.

16. A method according to claim 14, wherein the predetermined mode of the ring resonator is a spatial mode; and wherein said step of removing comprises filtering the spatial mode from the first and second input light beams.

17. A method according to claim 14, wherein the predetermined mode of the ring resonator is a polarization mode; and wherein said step of removing comprises filtering the polarization mode from the first and second input light beams.

18. A method according to claim 14, wherein said step of removing comprises:
    reflecting the non-mode-matched light portion off the first optical element;
    directing the portion of the first input light beam matched with the predetermined mode to a second optical element; and
    directing the portion of the second input light beam matched with the predetermined mode to a third optical element.

19. A method according to claim 18, wherein said step of directing a portion of the first input light beam comprises reflecting a majority of the portion of the first input light beam matched with the mode of the ring resonator off the second optical element; and
    wherein said step of directing a portion of the second input light beam comprises reflecting a majority of the portion of the second input light beam matched with the predetermined mode of the ring resonator off the third optical element.

20. A method according to claim 14 further comprising producing said transmissive components from said first and second circulating light beams, wherein said step of removing comprises removing said non-mode matched light portions prior to said step of producing said transmissive components.

* * * * *